United States Patent
Nakagiri (10) Patent No.: US 6,606,669 B1
(45) Date of Patent: *Aug. 12, 2003

(54) INFORMATION PROCESSING APPARATUS HAVING AUTOMATIC OS SELECTING FUNCTION

(75) Inventor: Koji Nakagiri, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/567,536

(22) Filed: Dec. 5, 1995

(30) Foreign Application Priority Data

Dec. 6, 1994 (JP) .............................. 6-301723

(51) Int. Cl.⁷ ................................. G06F 9/24
(52) U.S. Cl. ..................................... 709/327
(58) Field of Search ................. 395/681, 112, 395/848, 823, 856, 114; 364/200; 400/61; 709/321–327; 713/1

(56) References Cited

U.S. PATENT DOCUMENTS

| 4,533,996 | A | * | 8/1985 | Hartung et al. ................. 710/3 |
| 4,589,063 | A | | 5/1986 | Shah et al. ..................... 710/8 |
| 5,228,118 | A | * | 7/1993 | Sasaki ........................ 358/1.13 |
| 5,265,252 | A | * | 11/1993 | Rawson, III et al. ....... 709/326 |
| 5,390,301 | A | * | 2/1995 | Scherf ......................... 709/321 |
| 5,454,110 | A | * | 9/1995 | Kannan et al. ................ 713/2 |
| 5,463,736 | A | * | 10/1995 | Elko et al. .................... 710/28 |
| 5,465,364 | A | * | 11/1995 | Lathrop et al. ............. 709/321 |
| 5,504,904 | A | * | 4/1996 | Dayan et al. .................. 713/1 |
| 5,580,177 | A | * | 12/1996 | Gase et al. .................... 400/61 |
| 5,581,766 | A | * | 12/1996 | Spurlock ....................... 713/2 |
| 5,655,152 | A | * | 8/1997 | Ohnishi et al. .............. 710/36 |
| 5,692,111 | A | * | 11/1997 | Marbry ...................... 358/1.15 |
| 5,910,180 | A | | 6/1999 | Flory et al. ................. 709/321 |
| RE36,394 | E | * | 11/1999 | Advani et al. .............. 713/100 |
| 6,009,576 | A | | 12/1999 | Flory et al. ................. 709/324 |
| 6,289,396 | B1 | | 9/2001 | Keller et al. ................ 709/323 |
| 6,393,495 | B1 | | 5/2002 | Flory et al. ................. 709/327 |

FOREIGN PATENT DOCUMENTS

EP           0556994 A      8/1993        .......... G03G/15/00

* cited by examiner

*Primary Examiner*—St. John Courtenay, III
(74) *Attorney, Agent, or Firm*—Fitzpatrick, Cella, Harper & Scinto (57) ABSTRACT

There is provided an information processing apparatus which is constructed by a host computer and a peripheral device connected to the host computer through a bidirectional interface and which inputs and outputs data between the host computer and the peripheral device through a device driver that corresponds to the peripheral device and is loaded in the OS of the host computer. An output device such as a printer which is controlled by the host computer has an identifying unit to identify the kind of OS of the host computer and a controller to output a device driver for controlling the device to the host computer on the basis of the identification result. The peripheral device has a memory in which the device driver corresponding to the peripheral device has been stored, the device driver in the memory is transferred to the host computer as necessary and is loaded into the OS of the host computer.

74 Claims, 7 Drawing Sheets

INFORMATION PROCESSING APPARATUS HAVING AUTOMATIC OS SELECTING FUNCTION

BACKGROUND OF THE INVENTION

1. Field of the Invention

The present invention relates to an information processing apparatus and, particularly, to an information processing apparatus for inputting and outputting data to/from a device connected through a device driver (program) loaded in an OS (operating system) of a host computer.

2. Related Background Art

Hitherto, various products are used as OSs of a host computer. There is a case where among OS software, a portion (device driver) for driving devices such as printer, display, and the like is compiled integrally with a kernel of the OS. In recent years, however, the device driver is often constructed as what is called a loadable module that is read in accordance with a set file when the OS is booted or the like. There is also a device driver having a format of an application program so as to enable another device driver to be activated during the operation of the OS.

Recently, the device driver (program), particularly for a printer, is called a printer driver, a printer manager, or the like (hereinafter, simply referred to as a "printer driver"). In many conventional printer drivers, data is inputted and outputted to/from a printer port at a very low level. However, there is also considered a printer driver for translating between a page description language (printer control language) that is understood by the printer and another printer control language or a format in accordance with the OS.

There is also a printer driver which have therein softwares corresponding to a plurality of devices (not limited to the printer, but including a plotter and the like as well) and which enables various output devices such as printer and the like to output by designating a kind of the printer, or the like.

In the OS using the loadable device driver, a device which has not initially been supported by the OS can be used by replacing the printer driver. Recently, when the output device such as a printer or the like is purchased, there is a case where an exclusive-use device driver for the device in the major OS is annexed.

A number of OSs for controlling a host computer also exist nowadays. The same host computer is controlled by different OSs or a plurality of OSs are installed in the same host computer and one of the OSs is activated by switching them. When the OSs are different, since the description formats of the device drivers are also different, it is necessary to supply the device driver every OS even in case of the printer drivers for driving the same printer as a target.

On the other hand, recently, on the output device side as well, a method whereby the printers are connected to a plurality of printer ports or a method whereby printers are switched and connected by using a change-over switch is used in order to selectively use the devices in accordance with objects.

When the printer to be used is changed as mentioned above, it is naturally necessary to load the printer driver corresponding to the printer and to change the setting of the printer driver, and the like. There is a case such that the printer drivers are different for every OS as mentioned above or exist as different files on a disk, so that there are problems in that the work required of the user for correctly loading or changing the printer driver is very complicated and troublesome.

When a designation by a user is wrong, the data cannot be correctly outputted as a matter of course.

In the case where computers are connected to a network in which a number of printer devices exist, it is necessary to store all of the printer drivers in all of the computers on the network, which leads to the problem that resources of external memories (hard disk and the like) are consumed.

Although the above problems have been described with respect to a printer as an example, similar problems also occur in device drivers of other peripheral devices such as a display, plotter, sound card, PCMCIA card, and the like.

SUMMARY OF THE INVENTION

The invention is made to solve the above problems, and it is an object of the invention to provide an information processing apparatus which can automatically load a device driver (program) adaptive to a peripheral device that is used into an OS without an operation of the user, and which can prevent the use of a wrong device driver and prevent resources such as memory, disk, and the like of a computer being wasted.

In order to accomplish the above object, according to the invention, there is provided an information processing apparatus which is constructed by a host computer and a peripheral device connected to the host computer through a bidirectional interface (for instance, bicentronics) and which inputs and outputs data between the host computer and the peripheral device through the device driver that corresponds to the peripheral device and is loaded in the OS of the host computer, wherein the peripheral device has memory means in which the device driver corresponding to the peripheral device has been stored, and the device driver in the memory means is obtained from the peripheral device as necessary and is loaded into the OS of the host computer.

By such a construction, the device driver prepared for the peripheral device can be obtained from the peripheral device as necessary and can be automatically loaded into the OS.

DETAILED DESCRIPTION OF THE PREFERRED EMBODIMENTS

The invention will now be described in detail hereinbelow on the basis of the embodiments shown in the drawings. A printer as an output device and a printer driver (printer manager) as a device driver (program) will be described hereinbelow as an example.

Figure 1:
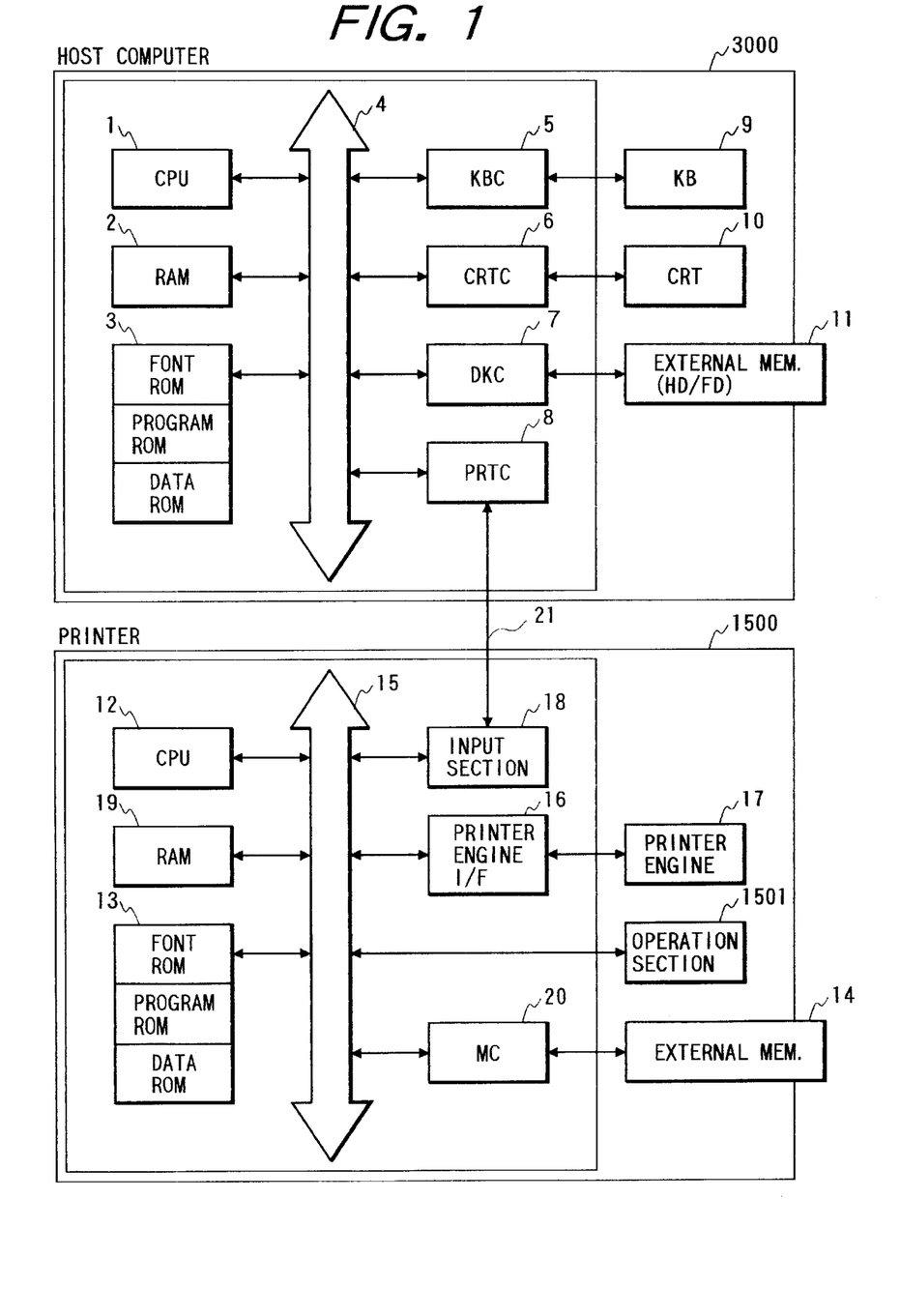
FIG. 1 is a block diagram for explaining a construction of a computer system to which the invention is applied.

FIG. 1 shows a computer system using the invention. Although the system constructed by a host computer 3000 and a printer (device) 1500 is shown here as an example, the invention which will be described hereinafter can be also applied to a single apparatus, a system comprising a plurality of apparatuses, and a system in which a printer is connected through a network such as a LAN or the like.

In the host computer 3000 in FIG. 1, reference numeral 1 denotes a CPU. In the embodiment, the CPU 1 processes a document in which figure, image, characters, table (including a table calculation or the like), and the like mixedly exist on the basis of a document processing program or the like stored in a ROM for programs in a ROM 3 or an external memory (hard disk, floppy disk, or the like) 11 and also controls devices connected to a system bus 4.

Reference numeral 2 indicates a RAM which functions as a main memory, a work area, or the like of the CPU 1.

Reference numeral 3 denotes the ROM. A control program (control program shown in flowcharts of FIGS. 6 and 7) of the CPU 1, an operating system program, and the like are stored in the program ROM in the ROM 3 or the external memory 11. The ROM 3 has: a portion for fonts which stores font data which is used upon document processes and the like; and a portion for data for storing various data which is used when the document processes or the like are executed.

Reference numeral 5 denotes a keyboard controller (KBC) for controlling a key input from a keyboard 9 or a pointing device (not shown). Reference numeral 6 denotes a CRT controller (CRTC) for controlling a display of a CRT display (CRT) 10.

Reference numeral 7 indicates a disk controller (DKC) for controlling inputting/outputting operations of data from/to the external memory 11 such as hard disk (HD), floppy disk (FD), or the like to store a boot program, various applications, font data, a user file, an edition file, a printer control command forming program (printer driver) and the like.

Reference numeral 8 denotes a printer controller (PRTC) which is connected to the printer 1500 through a predetermined bidirectional interface (for example, Centronics interface) 21 and executes a controlling process of a communication with the printer 1500.

In the document process of the CPU 1, it is assumed that a graphical interface is used and a control for equalizing an output from the printer 1500 and an output from the CRT 10, namely, what is called a WYSIWYG (What You See Is What You Get) process is. executed. In this case, for example, a developing (rasterizing) process of a bit map font or an outline font stored in the font ROM or the like is performed in a display information RAM set on the RAM 2. By transferring bit map data on the display information RAM to the printer 1500 or by using the outline font stored in the printer 1500, the same output can be obtained from the printer 1500 and CRT 10.

In the document process, the CPU 1 opens various windows registered on the basis of commands instructed by a mouse cursor (not shown) or the like on the CRT 10 and executes various data processes.

On the other hand, in the printer 1500, reference numeral 12 denotes a printer CPU for outputting an image signal as output information to a printing section (printer engine) 17 that is connected to a system bus 15 on the basis of a control program stored in the ROM portion for programs in a ROM 13 and a control program stored in an external memory 14.

Control programs (FIGS. 3 and 4) of the CPU 12, which will be described hereinbelow, and the like are also stored in the program ROM in the ROM 13 or the external memory 14. The font data which is used when the output information is formed or the like is stored in the ROM portion for fonts in the ROM 13. In the case of a printer having no external memory 14 such as a hard disk or the like, information which is used on the host computer is stored in the ROM portion for data in the ROM 13. The CPU 12 can execute a communicating process with the host computer through an input section 18 and can notify information in the printer or the like to the host computer 3000.

Reference numeral 19 denotes a RAM which functions as a main memory, a work area, or the like of the CPU 12. A memory capacity of the RAM 19 can be expanded by an optional RAM connected to an extension port (not shown). The RAM 19 is used in an output information developing area, an environment data memory area, an NVRAM, or the like.

An access to the external memory 14 such as hard disk (HD), IC card, or the like of the printer 1500 is controlled by a memory controller (MC) 20. The external memory 14 is connected as an option and stores font data, an emulation program, form data, and the like. A switch, an LED display and the like for the user interface are arranged on an operation section 1501.

The number of external memories of the host computer 3000 and the printer is not limited to one but at least one or more external memories can be provided. A plurality of external memories in which an optional font card and a program for interpreting printer control languages of different language systems in addition to the built-in fonts have been stored can be also connected. Further, the printer 1500 can also have an NVRAM (not shown) and printer mode setting information from the operation section 1501 can be also stored.

Further, according to the embodiment, printer drivers corresponding to various output devices such as a printer and the like are provided in the ROM 3 or external memory 11 on the host computer side. The operating system (OS) which controls the host computer is loaded into the RAM 2 and is executed, thereby controlling the corresponding output device such as a printer or the like.

For example, when a document formed by using an application program or the like on the host computer is printed, by giving various parameters to the printer driver loaded in the RAM 2, a printer control command necessary to print the document is formed and the formed printer control command is transferred to the printer through the interface 21, thereby printing.

In the embodiment, such a printer driver is prepared for the printer 1500. That is, the printer driver corresponding to the specification of the self machine is stored in the ROM 13 or external memory 14 of the printer 1500, is up-loaded to the host computer 3000 and is used. Preferably, various printer driver programs for various OSs which correspond to the specification of the self machine are stored and a proper printer driver program is enabled to be uploaded in accordance with the kind of OS that is notified from the host computer 3000 as will be described hereinlater.

Hitherto, for example, in case of printing the document formed by using the application program or the like on the host computer, when the printer driver for forming the control command of the connected printer is not preliminarily prepared in the ROM 3 or external memory 11 (hard disk), the printer driver is supplied to the user from the external memory 11 such as a floppy disk or the like. After that, the user designates the printer driver to the OS by the set file or a predetermined operation, thereby completing the installation of the printer driver for the first time.

According to the embodiment, however, the OS first obtains data for identifying the printer from the printer through the bidirectional interface 21. When the printer driver for the printer is not stored in the ROM 3 or external memory 11, the printer driver stored in the ROM 13 of the printer is further obtained and is stored into the external memory 11. After that, the printer driver is loaded into the RAM 2 and is executed or the printer driver is directly loaded to the RAM 2 and is executed, thereby forming the printer control commands necessary for printing the documents. The printer control commands can be transferred to the printer through the interface 21.

An embodiment of the invention will be described in detail hereinbelow with reference to the flowcharts and the like.

Figure 2:
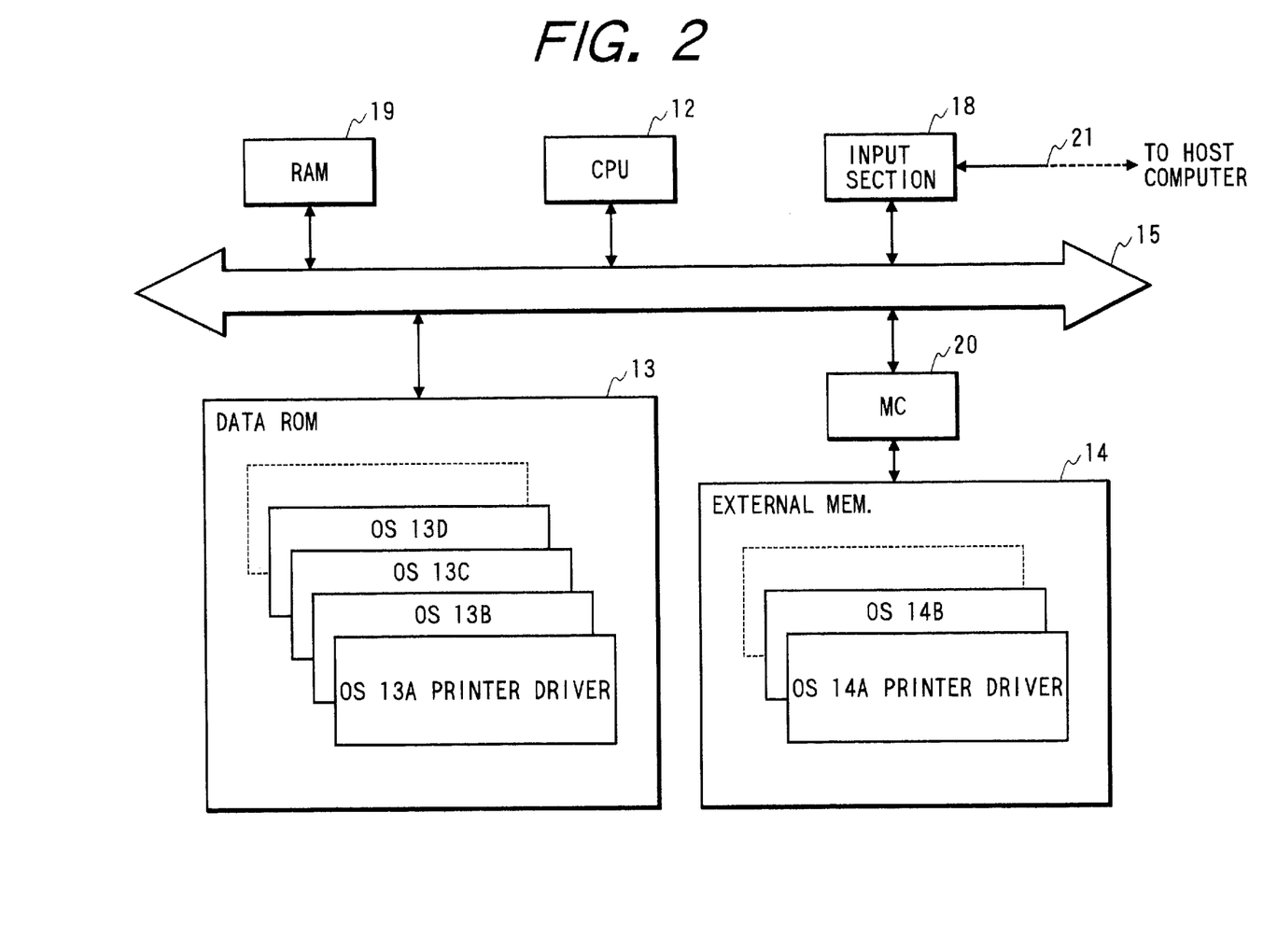
FIG. 2 is a block diagram for explaining a transfer of a printer driver in a printer in FIG. 1.

FIG. 2 shows a construction of the printer 1500 in more detail. In FIG. 2, the printer drivers which are different according to the OSs have been stored in the ROM 13 or external memory 14. The printer drivers corresponding to various OSs which are major in the market are prepared as many as possible and are stored in the ROM 13 or external memory 14. In FIG. 2, the printer drivers for a plurality of OSs are stored in both of the ROM 13 and external memory 14. The data formats of the printer drivers can be a loadable module format or an executable format as long as they are formed in accordance with the specifications of the corresponding OSs.

In the invention, the OS which controls the host computer to which the printer is connected is specified through the bidirectional interface 21 and the printer driver for the OS can be transferred by an instruction of the OS. When transferring the printer driver, it is also possible that the printer driver is once read into the RAM 19 on the printer and is transferred. The printer driver can be directly transferred from the ROM 13 or external memory 14 to the input section 18 if it is possible.

Figure 3:
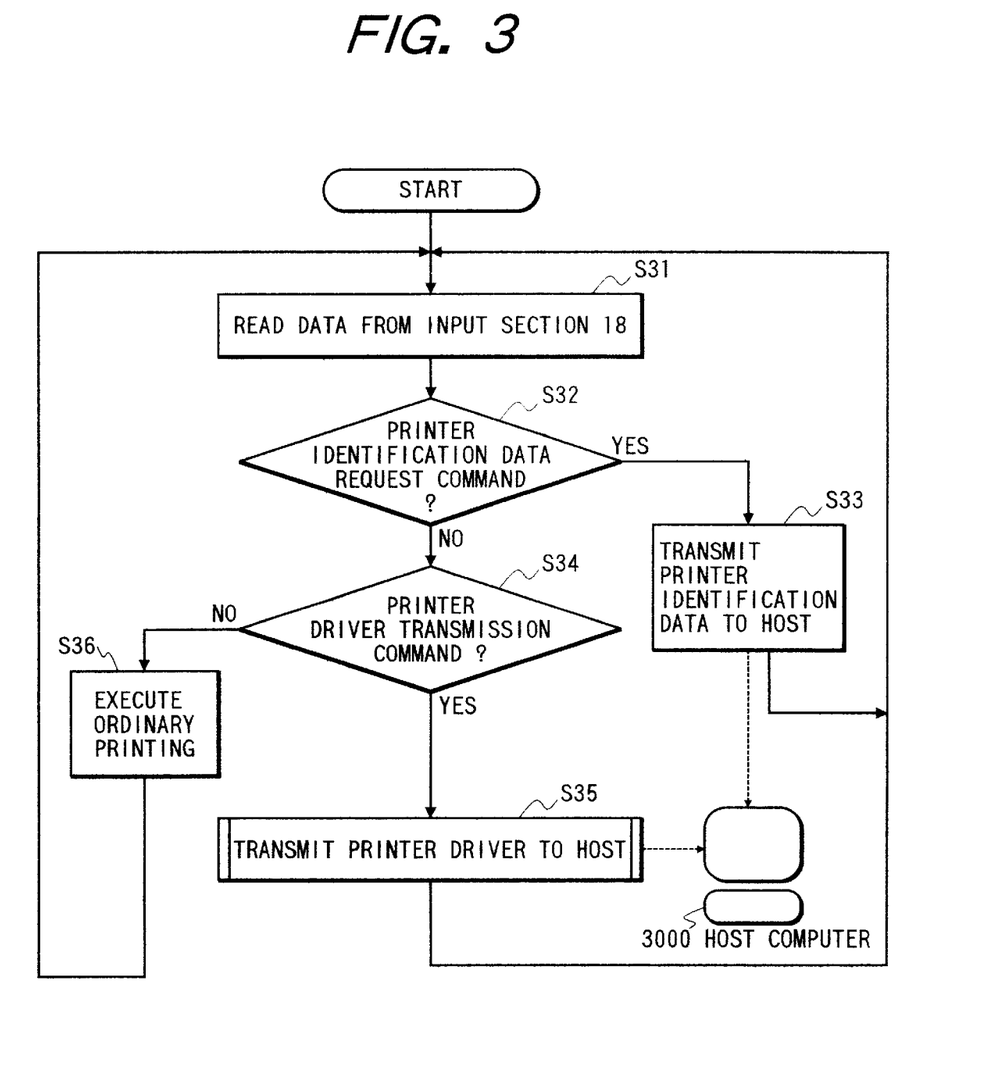
FIG. 3 is a flowchart showing a processing procedure for reception data in the printer in FIG. 1.

FIG. 3 shows a processing procedure for the reception data on the printer 1500 side. The processes are executed by the CPU 12 of the printer. In step S31 in FIG. 3, data transmitted through the bidirectional interface 21 is read out from the input section 18 and is transferred to the RAM 19.

In step S32, a check is made to see if the data is an identification data request command for identifying the printer of the OS. If YES, the printer identification data is transmitted to the host computer (step S33). Since the identification data request command for identifying the printer is transmitted to the printer 1500 at the stage when a formal printer driver corresponding to the printer 1500 does not (may not) operate, a relatively simple format (for instance, a predetermined escape sequence or the like) such that the command can be transmitted by directly controlling a port to which the printer is connected without passing through the printer driver is preferable. The printer identification data has preliminarily been stored in the data ROM 13 or external memory 14.

A check is made to see if the received data is a transmission command of the printer driver in step S34. If YES, the printer driver as a program for forming the printer control command is transmitted as data to the host computer (step S35).

When the received data is not a port identification data request nor the printer driver transmission command, it is judged that the received data is an ordinary print control command and a printing process is executed (step S36). The printer repeatedly executes the above processes.

Figure 4:
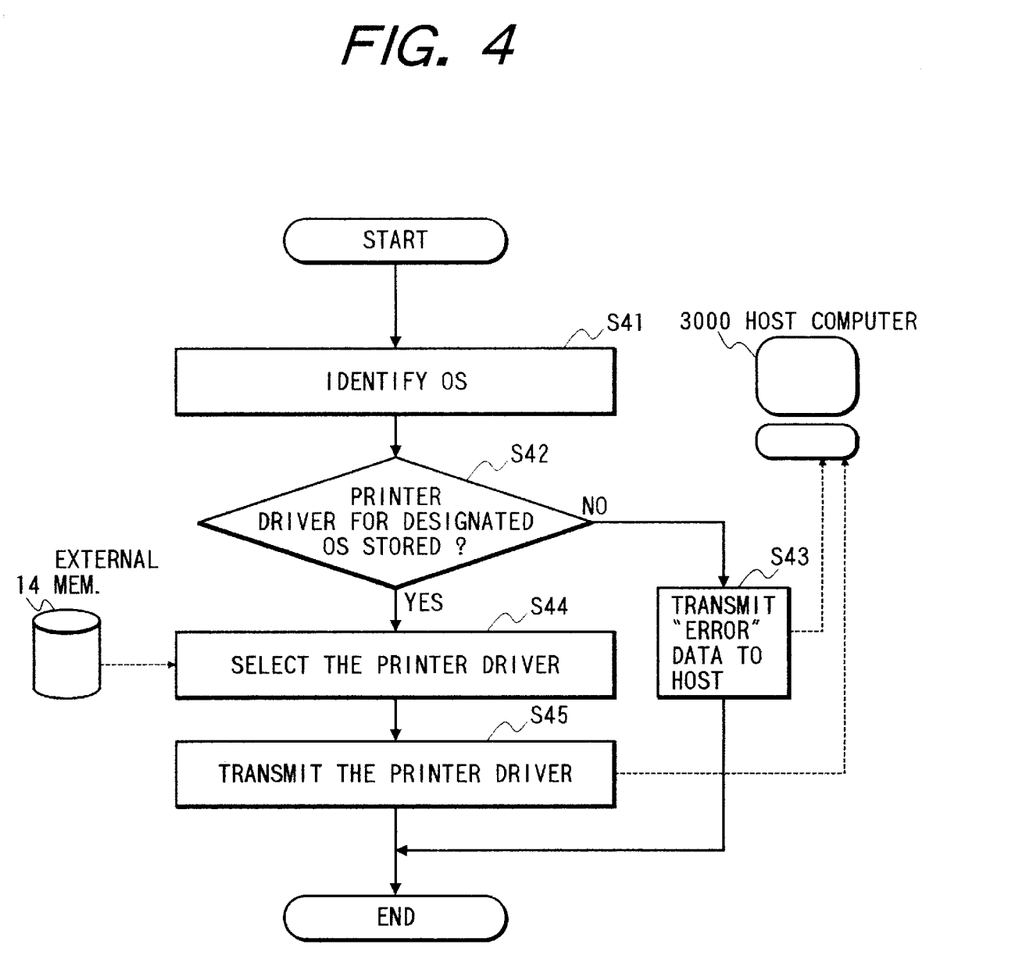
FIG. 4 is a flowchart showing a transfer processing procedure for the printer driver in the printer in FIG. 1.

FIG. 4 is a flowchart showing a processing procedure for transferring the printer driver in step S35 in FIG. 3. The processes are executed by the CPU 12 of the printer. It is now assumed that the printer driver transmission command judged in step S34 includes identification data which can identify the OS. The identification data of the OS is taken out in step S41.

A check is made in step S42 to see if the printer driver for the OS designated by the identification data exits in the ROM 13 or external memory 14. If the printer driver doesn't exist (step S43), data indicative of an error is transmitted to the host computer. When the designated printer driver exists, the printer driver corresponding to the OS identified in step S41 is transferred from the ROM 13 or external memory 14 to the RAM 19 (Steps S44, S45) and is transferred to the host computer 3000 through the bidirectional interface 21.

Figure 5:
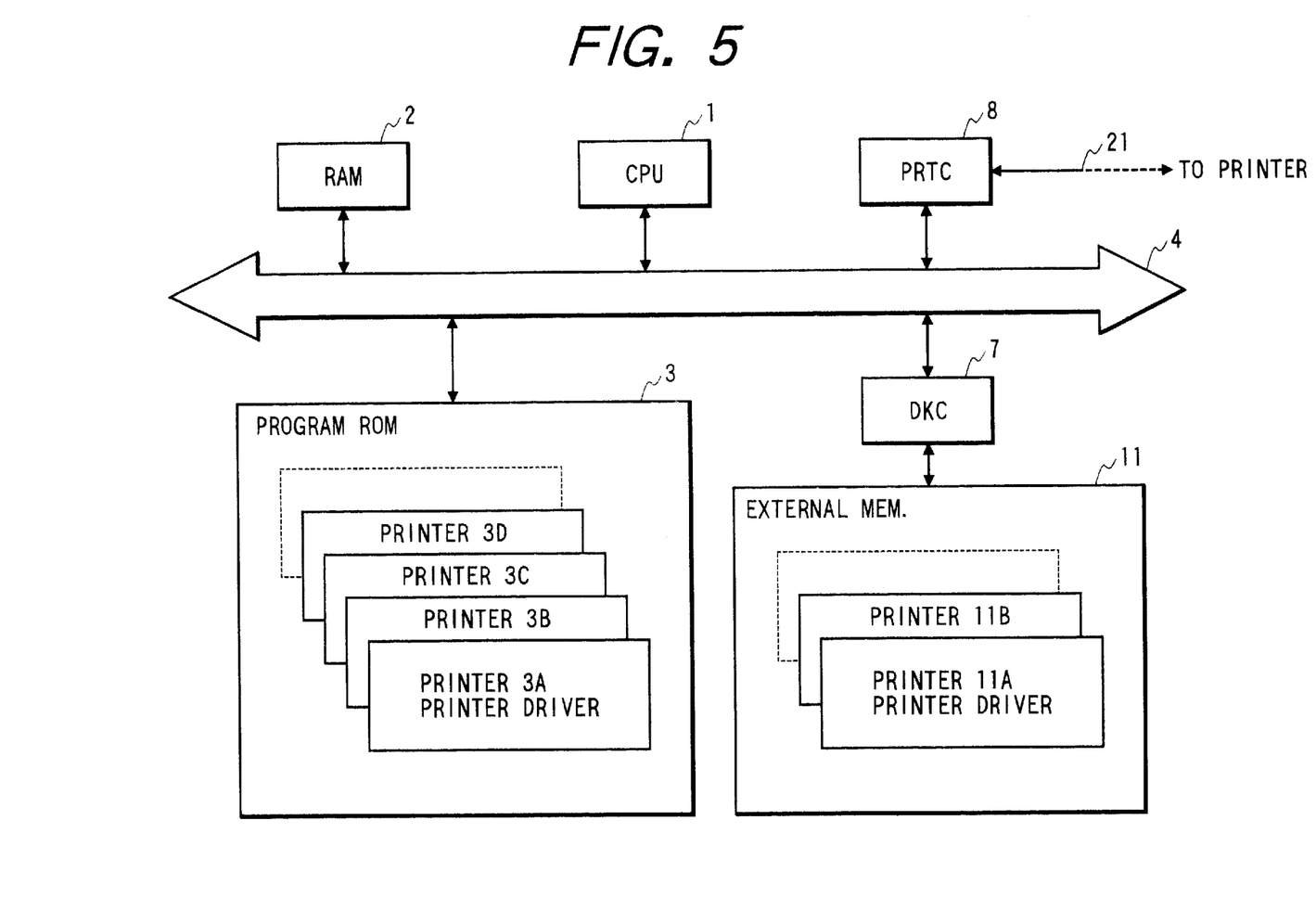
FIG. 5 is a block diagram for explaining a storage or loading of the printer driver in a host computer in FIG. 1.

FIG. 5 shows the main part of the host computer 3000 in detail. As shown in the diagram, the printer drivers which are different according to the printers or printer control languages have already been stored in the ROM 3 or external memory 11.

In the invention, the printer connected to the host computer is specified through the bidirectional interface 21 and the printer driver needed by the OS can be transferred to the printer. As mentioned above, when the printer driver is uploaded from the printer, the received printer driver can be once read into the RAM 2 on the host computer and, after that, stored into the external memory 11 or it can be also directly transferred to the external memory 11 if it is possible. The printer driver is loaded into the RAM 2 by an arbitrary proper method upon execution. When the printer driver is transferred from the printer to the host computer, the printer driver can be also compressed in a predetermined format and transferred. By such operations, a transfer speed between the printer and the host computer is improved.

Figure 6:
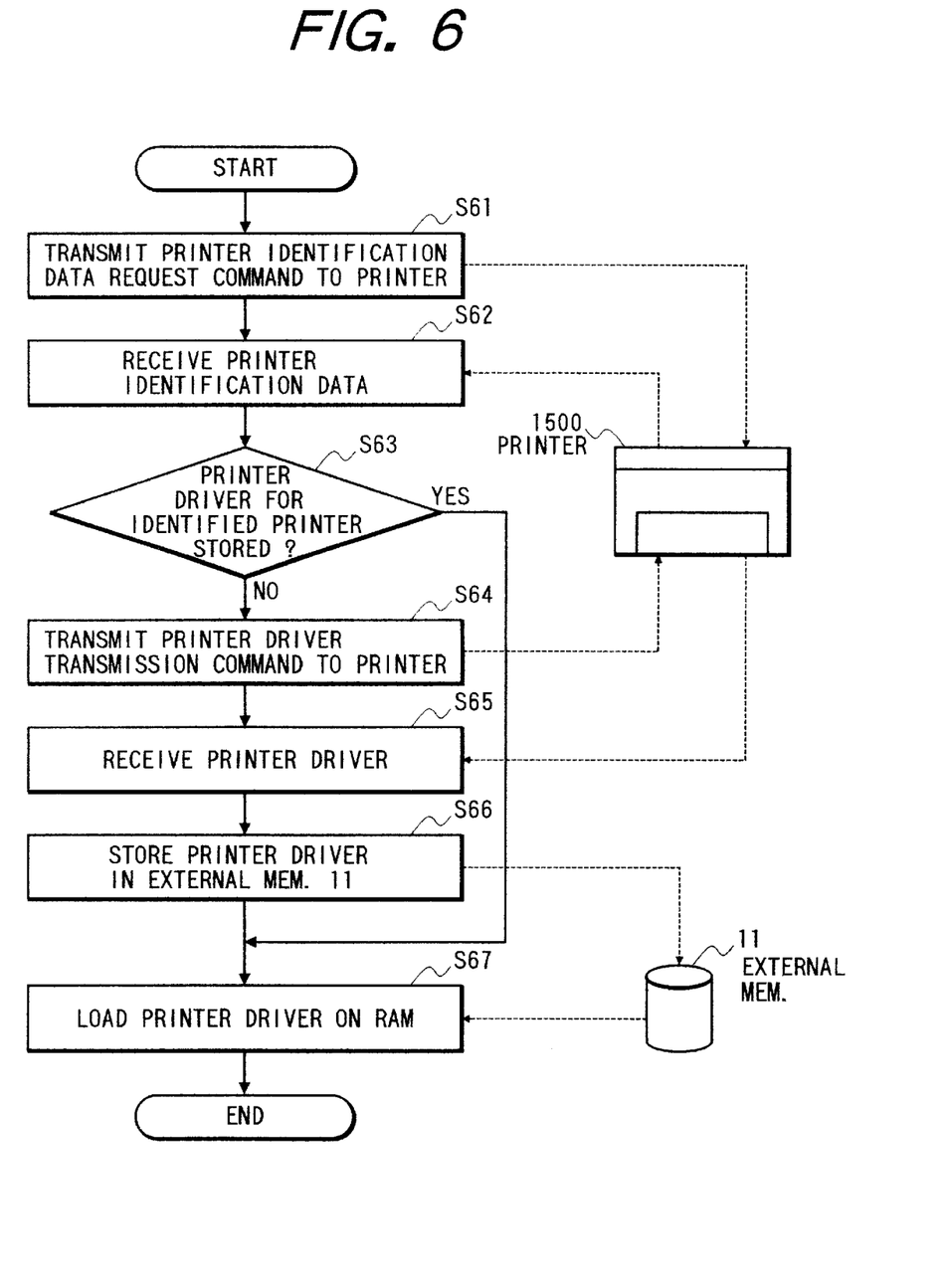
FIG. 6 is a flowchart showing a using method of the printer driver in an OS of the host computer in FIG. 1.

FIG. 6 shows a using method of the printer driver in the OS of the host computer. Processes of FIG. 6 are executed by the CPU 1 of the host computer.

In step S61 in FIG. 6, an identification data request command for identifying the printer is transmitted to the printer that is connected directly (or through a network or the like) at present (refer to steps S31 to S33 in FIG. 3). In step S62, the printer identification data returned from the printer is analyzed. The processes (steps S61 and S62) need to be executed at the time of the activation of the host computer or the printer, or when a connecting state of the device such as a printer 1500 or the like is updated, or the like.

In step S63, a check is made to see whether the printer driver for the identified printer exists in the ROM 3 or external memory 11. When the printer driver for the identified printer exists, the printer driver is transferred from the ROM 3 or external memory 11 to the RAM 2 and is outputted to the printer by using the printer driver. In this instance, the printer driver executes a process such that a drawing command used in the OS or application is converted to the printer control command (page description language) that can be understood by the printer, or the like.

When no printer driver exists in step S63, a printer driver transmission command is transmitted to the printer (step S64), the printer receives the transmitted printer driver in step S65, and the printer driver is stored into the external memory 11 (step S66). In step S67, the printer driver is loaded into the RAM 2, the drawing command formed on the basis of the application program is converted to the printer control command by using the printer driver, and the printer control command is outputted to the printer.

With respect to the transfer of the printer driver from the external memory 11 or the like to the RAM 2 in step S67, it is also possible to preliminarily directly transfer the printer driver from the PRTC 8 when it is received in step S66. By using the printer driver transferred onto the RAM 2, print data is converted to a printer print control command, thereby performing the printing.

According to the above embodiment, when the printer driver for the connected printer doesn't exist on the host computer, the printer driver built in the printer is transferred through the bidirectional interface, thereby enabling the printer driver to be automatically supplied to the OS without troubling the user.

That is, since the printer drivers for the self machine as many as the number of various OSs are prepared for the printer and a desired printer driver is transferred to the host as necessary and can be used by the OS of the host, the correct printer driver can be automatically loaded to the OS without designating the printer driver by the user.

In case of selecting the printer driver, since an intervention of the user is unnecessary, the printer driver is not erroneously used, so that the printing of a high quality can be always performed.

Figure 7:
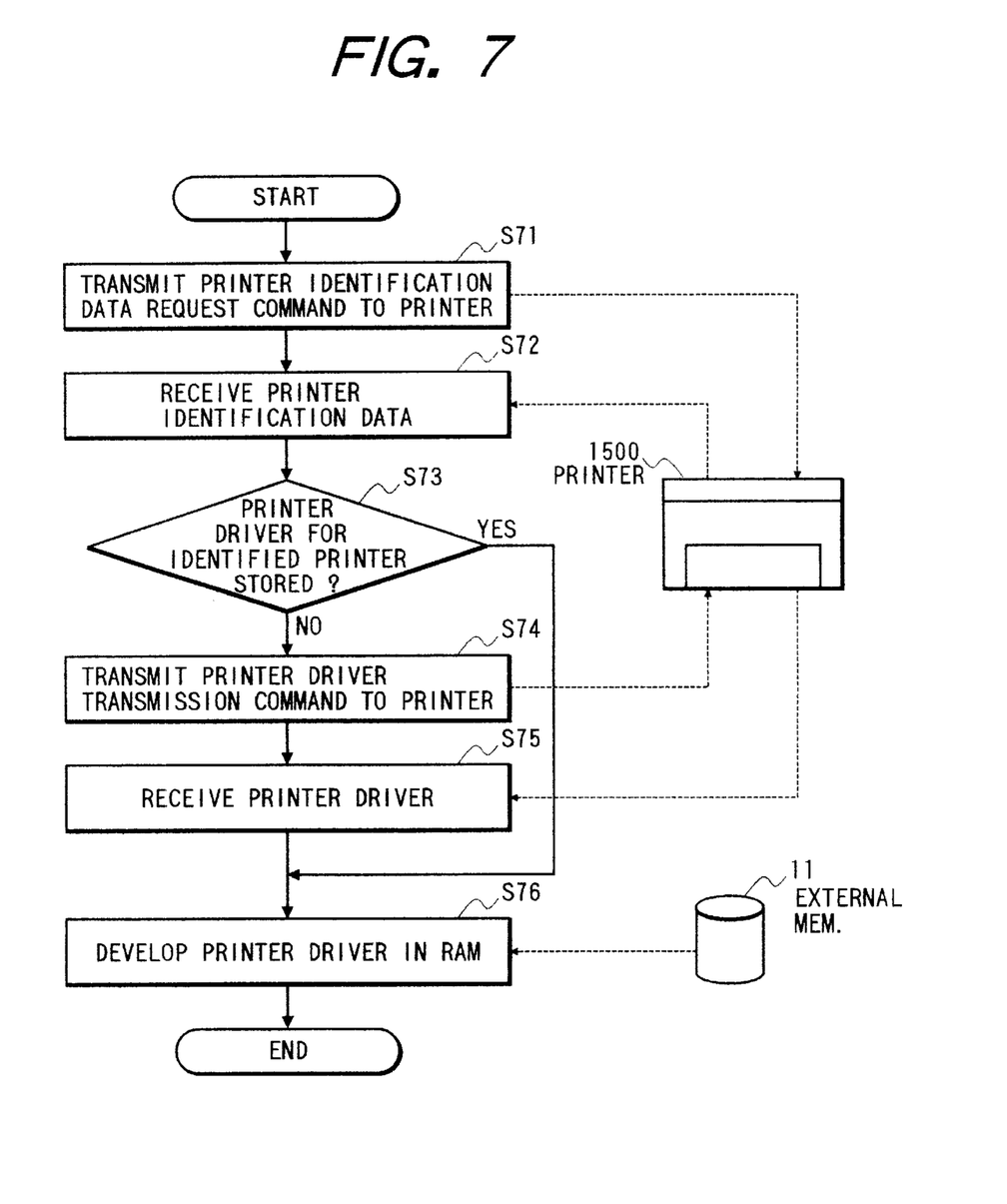
FIG. 7 is a flowchart showing a different using method of the printer driver in the OS of the host computer in FIG. 1.

According to the embodiment, when the printer driver is up-loaded from the printer, by storing the printer driver into the external memory (such as a hard disk drive or the like), the up-loading of the printer driver is unnecessary from the next time on. As shown in FIG. 7, however, there is also considered a process of up-loading the printer driver every printing, namely, dynamically replacing the printer driver.

FIG. 7 shows processes on the host side. In step S71 in FIG. 7, a data request command for identifying the printer is transmitted to the printer connected directly or through the network at present. In step S72, the printer identification data returned by the printer is analyzed. Although the processes (steps S71 and S72) are executed when the host computer is activated, when the printer is activated, when their connecting states are updated, or the like, they have to be also executed when the printing is executed and when an inquiry of information depending on the printer such as a font for the WYSIWYG process is necessary.

In step S73, a check is made to see if the printer driver for the identified printer exists in the ROM 3 or external memory 11. If YES, the printer driver is transferred from the ROM 3 or external memory 11 to the RAM 2, the drawing command is converted to the printer control command by using the transferred printer driver and the printer control command is outputted to the printer. When the printer driver doesn't exist, the printer driver transmission command is transmitted to the printer (step S74), the data returned from the printer is received in step S75 and the printer driver is developed in the RAM 2 (step S76).

That is, different from FIG. 6, the printer driver is not stored into the external memory 11 but is directly developed in the RAM 2, the program is executed, the drawing command is converted to the printer control command, and the printer control command is outputted to the printer in FIG. 7. Consequently, the printer driver can be dynamically replaced without storing and holding the printer driver onto the host computer and a consumption of the external memory can be suppressed. For example, the consumption of the external memory by the printer driver of the printer which is rarely used can be suppressed, so that the external memory can be provided for storing the user data.

Although the printer has been described above as an embodiment, a similar construction can be also realized even in case of device drivers such as a display, a plotter, a sound card, and other peripheral devices. The interface between the peripheral device and the host is not limited to the printer port but any device such as serial port, SCSI port, extension bus, or the like can be also used. It is sufficient to construct in a manner such that the device driver of the peripheral device is prepared for the peripheral device and the device driver is transferred to the host as necessary and is loaded to the OS of the host.

As will be obviously understood from the above description, according to the invention, there is provided the information processing apparatus which is constructed by the host computer and the peripheral device connected to the host computer through the bidirectional interface and which inputs and outputs data between the host computer and the peripheral device through the device driver that corresponds to the peripheral device and is loaded in the OS of the host computer, wherein the peripheral device has memory means in which the device driver corresponding to the peripheral device has been stored, the device driver in the memory means is transferred to the host computer as necessary and is loaded into the OS of the host computer. Thus, the device driver prepared for the peripheral device can be transferred to the host computer as necessary and automatically loaded into the OS, the OS can automatically use the correct device driver adaptive to the connected peripheral device without troubling the user, and it can be prevented that the device drive is erroneously used. By dynamically transferring the device driver from the peripheral device to the host computer, the consumption of the external memory device of the host computer can be suppressed.

What is claimed is:

1. An output control apparatus connected to an information processing apparatus, suitable for use in an environment with workstations running on multiple operating systems, said output control apparatus comprising:

a reception means for receiving from the information processing apparatus a printer driver output command for instructing said output control apparatus to send to the information processing apparatus a printer driver for generating print data in the information processing apparatus, the printer driver output command including OS identification information identifying what kind of OS the information processing apparatus operates on;

memory means for storing a plurality of different printer drivers used for respective OSs which correspond to specification of a certain printer;

means for identifying the kind of the OS on which the information processing apparatus is operating, based on the OS identification information included in the printer driver output command received by said reception means of said output control apparatus; and control means for selecting, at said output control apparatus, a printer driver for generating print data on the OS of the information processing apparatus from among the plurality of printer drivers stored in said memory means, on the basis of an identification result provided by said identifying means, and for outputting the selected printer driver to the information processing apparatus.

2. An output control apparatus according to claim 1, wherein said control means selects the printer driver corresponding to the OS identified by said identifying means.

3. An output control apparatus according to claim 2, wherein, when the printer driver corresponding to the OS identified by said identifying means cannot be selected, said control means notifies the information processing apparatus of such fact.

4. An output control apparatus according to claim 1, wherein the information processing apparatus is a host computer.

5. An output control apparatus according to claim 1, wherein the information processing apparatus and said output control apparatus are connected through a bi-directional interface.

6. An information processing apparatus for controlling a device, suitable for use in an environment with workstations running in multiple operating systems, said apparatus comprising:

means for identifying what kind of device the device is;

a judging means for judging whether a device driver for controlling the device exists in a memory, on the basis of an identification result provided by said identifying means;

request means for sending a command to an external apparatus which stores a plurality of different device drivers used for respective OSs which correspond to specification of a certain device, for requesting the external apparatus to transmit the device driver for the device to said information processing apparatus when said judging means judges that the device driver does not exist in the memory, the command including information identifying what kind of OS said information processing apparatus operates on; and control means for receiving the device driver transmitted by the external apparatus in response to the command sent by said request means and for controlling the device based on the received device driver, the received device driver being optimum for the OS of said information processing apparatus.

7. An apparatus according to claim 6, wherein the device is a printer.

8. An apparatus according to claim 6, wherein said information processing apparatus is a host computer.

9. An apparatus according to claim 6, wherein said information processing apparatus and the device are connected through a bi-directional interface.

10. An information processing apparatus according to claim 6, wherein the device driver is a printer drive and wherein said control means generates print data based on the printer driver.

11. An information processing apparatus according to claim 8, wherein, when said judging means judges that the device driver exists in the memory, said control means controls the device based on the existing device driver.

12. A memory medium for use in an output control apparatus connected to an information processing apparatus, and suitable for use in an environment with workstations running in multiple operating systems, wherein a printer driver output command is received from the information processing apparatus for instructing the output control apparatus to send to the information processing apparatus a printer driver for generating print data in the information processing apparatus, the printer driver output command including OS identification information identifying what kind of OS the information processing apparatus operates on, a kind of an OS of the information processing apparatus is identified in response to the OS identification information included in the printer driver output command, and the printer driver is selected for generating print data on the OS of the information processing apparatus, from among a plurality of printer drivers stored in a memory means of the output control apparatus, and the selected printer driver is output to the information processing apparatus on the basis of an identification result.

13. A medium according to claim 12, wherein said program selects the printer driver which corresponds to the identified OS.

14. A medium according to claim 13, wherein, when the printer driver corresponding to the identified OS cannot be selected, said program notifies the information processing apparatus of such fact.

15. A medium according to claim 12, wherein the information processing apparatus is a host computer.

16. A medium according to claim 12, wherein the information processing apparatus and output control apparatus are connected through a bi-directional interface.

17. A memory medium for use in an information processing apparatus for controlling a device, and suitable for use in an environment out with workstations running in multiple operating systems, wherein an identification is made as to what kind of device the device is, a judgment is made as to whether a device driver for controlling the device exists in a memory or not, on the basis of the identification, a command is sent to an external apparatus for requesting the external apparatus, which stores a plurality of different device drivers used for respective OS's which correspond to specification of a certain device, to transmit the device driver to the information processing apparatus, when it is judged that the device driver does not exist in the memory, the command including information identifying what kind of OS the information processing apparatus operates on, and the device driver transmitted by the external apparatus is received in response to the command, and the device is controlled based on the received device driver, the received device driver being optimum for the OS of the information processing apparatus.

18. A medium according to claim 17, wherein the device is a printer.

19. A medium according to claim 17, wherein the information processing apparatus is a host computer.

20. A medium according to claim 17, wherein the information processing apparatus and the device are connected through a bi-directional interface.

21. A medium according to claim 17, wherein the device driver is a printer drive and wherein print data is generated based on the printer driver.

22. A medium according to claim 17, wherein, when it is judged that the device driver exists in the memory, the device is controlled based on the existing device driver.

23. A method according to claim 17, wherein the information processing apparatus and the device are connected through a bi-directional interface.

24. A method of controlling an output control apparatus connected to an information processing apparatus, suitable for use in an environment with workstations running in multiple operating systems, wherein a printer driver output command is received from the information processing apparatus for instructing the output control apparatus to send to the information processing apparatus a printer driver for generating print data in the information processing apparatus, the printer driver output command including OS identification information identifying what kind of OS the information processing apparatus operates on, a kind of an OS of the information processing apparatus is identified in response to the OS identification information included in the printer driver output command, and the printer driver is selected for generating print data on the OS of the information processing apparatus, from among a plurality of printer drivers stored in a memory means of the output control apparatus, and the selected printer driver is output to the information processing apparatus on the basis of an identification result.

25. A method according to claim 24, wherein the kind of the OS of the information processing apparatus is identified on the basis of OS identification information included in a printer driver output command.

26. A method according to claim 24, wherein the printer driver which corresponds to the identified OS is selected.

27. A method according to claim 26, wherein, when the printer driver corresponding to the identified OS cannot be selected, said program notifies the information processing apparatus of such fact.

28. A method according to claim 24, wherein the information processing apparatus is a host computer.

29. A method according to claim 24, wherein the information processing apparatus and the output control apparatus are connected through a bi-directional interface.

30. A method used in an information processing apparatus for controlling a device, suitable for use in an environment with workstations running in multiple operating systems, wherein what kind of device the device is, is identified, a judgment is made as to whether a device driver for controlling the device exists in a memory or not, on the basis of an identification result, a command is sent to an external apparatus for requesting the external apparatus, which stores a plurality of different device drivers used for respective OSs which correspond to specification of a certain device, to transmit the device driver to the information processing apparatus, when it is judged that the device driver does not exist in the memory, the command including information identifying what kind of OS the information processing apparatus operates on, and the device driver transmitted by the external apparatus is received in response to the command, and the device is controlled based on the received device driver, the received device driver being optimum for the OS of the information processing apparatus.

31. A method according to claim 30, wherein the device is a printer.

32. A method according to claim 30, wherein the information processing apparatus is a host computer.

33. A method according to claim 30, wherein the sent command includes information for identifying a kind of an OS of the information processing apparatus.

34. A method according to claim 30, wherein the device driver is a printer drive and wherein print data is generated based on the printer driver.

35. A method according to claim 30, wherein, when it is judged that the device driver exists in the memory, the device is controlled based on the existing device driver.

36. An output control apparatus connected to an information processing apparatus, suitable for use in an environment with workstations running on multiple operating systems, said output control apparatus comprising:

a receiver arranged to receive from the information processing apparatus a printer driver output command for instructing said output control apparatus to send to the information processing apparatus a printer driver for generating print data in the information processing apparatus, the printer driver output command including OS identification information identifying what kind of OS the information processing apparatus operates on;

memory, arranged to receive and store a plurality of different printer drivers used for respective OSs which correspond to specification of a certain printer;

an OS identification unit, adapted to identify the kind of the OS on which the information processing apparatus is operating, based on the OS identification information included in the printer driver output command received by said receiver of said output control apparatus; and a controller, adapted to select, at said output control apparatus, a printer driver for generating print data on the OS of the information processing apparatus from among the plurality of printer drivers stored in said memory, on the basis of an identification result provided by said OS identification unit, and for outputting the selected printer driver to the information processing apparatus.

37. An output control apparatus according to claim 36, wherein said controller selects the printer driver corresponding to the OS identified by said OS identification unit.

38. An output control apparatus according to claim 37, wherein, when the printer driver corresponding to the OS identified by said OS identification unit cannot be selected, said controller notifies the information processing apparatus of such fact.

39. An output control apparatus according to claim 36, wherein the information processing apparatus is a host computer.

40. An output control apparatus according to claim 36, wherein the information processing apparatus and said output control apparatus are connected through a bi-directional interface.

41. An information processing apparatus for controlling a device, suitable for use in an environment with workstations running in multiple operating systems, said apparatus comprising:

an identification unit, adapted to identify what kind of device the device is;

a judgment unit, adapted to judge whether a device driver for controlling the device exists in a memory, on the basis of an identification result provided by said identification unit;

a request originator, which sends a command to an external apparatus which stores a plurality of different device drivers used for respective OSs which correspond to specification of a certain device, to request the external apparatus to transmit the device driver for the device to said information processing apparatus when said judgment unit judges that the device driver does not exist in the memory, the command including information identifying what kind of OS said information processing apparatus operates on; and a controller adapted to receive the device driver transmitted by the external apparatus in response to the command sent by said request originator and to control the device based on the received device driver, the received device driver being optimum for the OS of said information processing apparatus.

42. An apparatus according to claim 41, wherein the device is a printer.

43. An apparatus according to claim 41, wherein said information processing apparatus and the device are connected through a bi-directional interface.

44. An information processing apparatus according to 41, wherein the command sent by said request originator includes information for identifying a kind of an OS of the information processing apparatus.

45. An information processing apparatus according to claim 41, wherein the device driver is a printer drive and wherein said controller generates print data based on the printer driver.

46. An information processing apparatus according to claim 41, wherein, when said judgment unit judges that the device driver exists in the memory, said controller controls the device based on the existing device driver.

47. An apparatus according to claim 41, wherein said information processing apparatus is a host computer.

48. A program product for use in an output control apparatus connected to an information processing apparatus, and suitable for use in an environment with workstations running in multiple operating systems, wherein a printer driver output command is received from the information processing apparatus for instructing the output control apparatus to send to the information processing apparatus a printer driver for generating print data in the information processing apparatus, the printer driver output command including OS identification information identifying what kind of OS the information processing apparatus operates on, a kind of an OS of the information processing apparatus is identified in response to the OS identification information included in the printer driver output command, and the printer driver is selected for generating print data on the OS of the information processing apparatus, from among a plurality of printer drivers stored in a memory means of the output control apparatus, and the selected printer driver is output to the information processing apparatus on the basis of an identification result.

49. A program product according to claim 48, wherein said program selects the printer driver which corresponds to the identified OS.

50. A program product according to claim 49, wherein, when the printer driver corresponding to the identified OS cannot be selected, said program notifies the information processing apparatus of such fact.

51. A program product according to claim 48, wherein the information processing apparatus is a host computer.

52. A program product according to claim 48, wherein the information processing apparatus and output control apparatus are connected through a bi-directional interface.

53. A program product for use in an information processing apparatus for controlling a device, and suitable for use in an environment with workstations running in multiple operating systems, wherein what kind of device the device is, is identified, a judgment is made as to whether a device driver for controlling the device exists in a memory or not, on the basis of an identification result, a command is sent to an external apparatus for requesting the external apparatus, which stores a plurality of different device drivers used for respective OSs which correspond to specification of a certain device, to transmit the device driver to the information processing apparatus, when it is judged that the device driver does not exist in the memory, the command including information identifying what kind of OS the information processing apparatus operates on, and the device driver transmitted by the external apparatus is received in response to the command, and the device is controlled based on the received device driver, the received device driver being optimum for the OS of the information processing apparatus.

54. A program product according to claim 53, wherein the device is a printer.

55. A program product according to claim 53, wherein the information processing apparatus is a host computer.

56. A program product according to claim 53, wherein the information processing apparatus and the device are connected through a bi-directional interface.

57. A program product according to claim 53, wherein the sent command includes information for identifying a kind of an OS of the information processing apparatus.

58. A program product according to claim 53, wherein the device driver is a printer drive and wherein print data is generated based on the printer driver.

59. A program product according to claim 53, wherein, when it is judged that the device driver exists in the memory, the device is controlled based on the existing device driver.

60. An output control apparatus connectable to an information processing apparatus, said output control apparatus comprising:

reception means for receiving from the information processing apparatus a device driver output command for instructing said output control apparatus to send to the information processing apparatus a device driver for controlling said output control apparatus, the device driver output command including identification information identifying what kind of OS the information processing apparatus operates on;

memory means for storing a plurality of different device drivers used for respective OSs; and control means for selecting one device driver suitable for the OS of the information processing apparatus from among the plurality of device drivers stored in said memory means, on the basis of the OS identification information included in the device driver output command received by said reception means, and for outputting the selected device driver to the information processing apparatus.

61. An output control apparatus according to claim 60, wherein if it is impossible to select any device driver suitable for the OS of the information processing apparatus, said control means informs the information processing apparatus that no suitable device driver can be selected.

62. An information processing apparatus for controlling a device provided with a plurality of different device drivers used for respective OSs, said apparatus comprising:

identifying means for identifying what kind of device the device is;

judging means for judging whether a device driver for controlling the device exists in a memory, on the basis of an identification result provided by said identifying means;

request means for sending a command to the device requesting the device to transmit the device driver for the device to said information processing apparatus when said judging means judges that the device driver does not exist in the memory, the command including information identifying what kind of OS said information processing apparatus operates on; and control means for receiving the device driver transmitted by the device in response to the command sent by said request means and for controlling the device based on the received device driver, the received device driver being tailored for the OS of said information processing apparatus.

63. An apparatus according to claim 62, wherein said identifying means identifies what kind of device the device is when the device is selected as a device to be controlled.

64. An apparatus according to claim 62, wherein if said judging means judges that the device driver for controlling the device exists in the memory, said control means controls the device based on the existing device driver.

65. A method of controlling an output control apparatus connectable to an information processing apparatus comprising the steps of:

receiving, by the output control apparatus, from the information processing apparatus, a device driver output command for instructing the output control apparatus to send to the information processing apparatus a device driver for controlling said output control apparatus, the device driver output command including identification information identifying what kind of OS the information processing apparatus operates on;

storing, by the output control apparatus, a plurality of different device drivers used for respective OSs; and selecting, by the output control apparatus, one device driver suitable for the OS of the information processing apparatus from among the plurality of device drivers stored by said storing step, on the basis of the OS identification information included in the device driver output command received by said receiving step, and for outputting the selected device driver to the information processing apparatus.

66. An output control method according to claim 65, wherein if it is impossible to select any device driver suitable for the OS of the information processing apparatus in said selecting step, further comprising the step of informing the information processing apparatus that no suitable device driver can be selected.

67. An information processing method for controlling a device from an information processing apparatus, the device being provided with a plurality of different device drivers used for respective OSs, said method comprising the steps of:

identifying what kind of device the device is;

judging whether a device driver for controlling the device exists in a memory, on the basis of an identification result provided by said identifying step;

sending a command to the device requesting the device to transmit the device driver for the device to said information processing apparatus when it is judged in said judging step that the device driver does not exist in the memory, the command including information identifying what kind of OS said information processing apparatus operates on; and receiving the device driver transmitted by the device in response to the command sent by said sending step and controlling the device based on the received device driver, the received device driver being tailored for the OS of said information processing apparatus.

68. A method according to claim 67, wherein said identifying step identifies the kind of device the device is when the device is selected as a device to be controlled.

69. A method according to claim 67, wherein if said judging step judges that the device driver for controlling the device exists in the memory, the device is controlled based on the existing device driver.

70. A memory medium, storing computer-executable code executable to perform a method of controlling an output control apparatus connectable to an information processing apparatus, said code comprising:

code to receive, by the output control apparatus, from the information processing apparatus, a device driver output command instructing the output control apparatus to send to the information processing apparatus a device driver for controlling the output control apparatus, the device driver output command including identification information identifying what kind of OS the information processing apparatus operates on;

code to store, by the output control apparatus, a plurality of different device drivers used for respective OSs; and code to select, by the output control apparatus, one device driver suitable for the OS of the information processing apparatus from among the plurality of device drivers stored by said code to store, on the basis of the OS identification information included in the received device driver output command, and to output the selected device driver to the information processing apparatus.

71. A memory medium according to claim 70, wherein if it is impossible to select any device driver suitable for the OS of the information processing apparatus, further comprising code to inform the information processing apparatus that no suitable device driver can be selected.

72. A memory medium, storing computer-executable code executable in an information processing apparatus to perform an information processing method for controlling a device provided with a plurality of different device drivers used for respective OSs, said code comprising:

code to identify what kind of device the device is;

code to judge whether a device driver for controlling the device exists in a memory, on the basis of an identification result provided by said code to identify;

code to send a command to the device requesting the device to transmit the device driver for the device to said information processing apparatus when it is judged that the device driver does not exist in the memory, the command including information identifying what kind of OS said information processing apparatus operates on; and code to receive the device driver transmitted by the device in response to the command, and to control the device based on the received device driver, the received device driver being tailored for the OS of said information processing apparatus.

73. A memory medium according to claim 72, wherein the kind of device is identified when the device is selected as a device to be controlled.

74. A memory medium according to claim 72, wherein if the device driver for controlling the device exists in the memory, the device is controlled based on the existing device driver.

* * * * *

UNITED STATES PATENT AND TRADEMARK OFFICE
CERTIFICATE OF CORRECTION

PATENT NO.    : 6,606,669 B1
DATED         : August 12, 2003
INVENTOR(S)   : Koji Nakagiri It is certified that error appears in the above-identified patent and that said Letters Patent is hereby corrected as shown below:

Column 1,
Line 15, "as" should read -- as a --;
Line 33, "have" should read -- has --;
Line 36, "printer" should read -- a printer --;
Line 50, "every OS even is case of" should read -- each OS even in a case that --; and
Line 51, "for driving" should read -- are driving --.

Column 3,
Line 45, "is." should read -- is --.

Column 4,
Line 49, "specification of the self machine" should read -- specific printer --; and
Line 53, "specification of the self machine" should read -- specific printer --.

Column 7,
Line 12, "the self machine" should read -- to accommodate --;
Line 27, "every" should read -- upon every --;
Line 51, "different" should read -- differently --; and
Line 57, "onto" should read -- in --.

Column 8,
Line 26, "drive" should read -- driver --.

Column 9,
Line 41, "drive" should read -- driver --.

Column 10,
Line 27, "OS's" should read -- OSs --; and
Line 47, "drive" should read -- driver --.

Column 11,
Line 56, "drive" should read -- driver --.

Column 13,
Line 5, "drive" should read -- driver --.

UNITED STATES PATENT AND TRADEMARK OFFICE
CERTIFICATE OF CORRECTION

PATENT NO. : 6,606,669 B1
DATED : August 12, 2003
INVENTOR(S) : Koji Nakagiri

It is certified that error appears in the above-identified patent and that said Letters Patent is hereby corrected as shown below:

<u>Column 14,</u>
Line 14, "drive" should read -- driver --.

Signed and Sealed this

Twentieth Day of January, 2004

JON W. DUDAS
*Acting Director of the United States Patent and Trademark Office*